United States Patent
Li et al.

(10) Patent No.: US 11,836,188 B2
(45) Date of Patent: Dec. 5, 2023

(54) DEVICES AND METHODS FOR ACCESSING AND RETRIEVING DATA IN A GRAPH

(71) Applicant: Alibaba Damo (Hangzhou) Technology Co., Ltd., Hangzhou (CN)

(72) Inventors: Shuangchen Li, Hangzhou (CN); Tianchan Guan, Hangzhou (CN); Zhe Zhang, Hangzhou (CN); Heng Liu, Hangzhou (CN); Wei Han, Hangzhou (CN); Dimin Niu, Hangzhou (CN); Hongzhong Zheng, Hangzhou (CN)

(73) Assignee: Alibaba Damo (Hangzhou) Technology Co., Ltd, Hangzhou (CN)

( * ) Notice: Subject to any disclaimer, the term of this patent is extended or adjusted under 35 U.S.C. 154(b) by 129 days.

(21) Appl. No.: 17/581,757

(22) Filed: Jan. 21, 2022

(65) Prior Publication Data
US 2023/0137162 A1   May 4, 2023

(30) Foreign Application Priority Data
Nov. 2, 2021   (CN) .......................... 202111285510.4

(51) Int. Cl.
*G06F 16/901*   (2019.01)

(52) U.S. Cl.
CPC ................. *G06F 16/9024* (2019.01)

(58) Field of Classification Search
CPC .. G06F 16/9024; G06F 3/0626; G06F 3/0602; G06F 3/0611; G06F 3/064; G06F 3/0656; G06F 3/0679
See application file for complete search history.

(56) References Cited

U.S. PATENT DOCUMENTS

| | | | | |
|---|---|---|---|---|
| 10,382,527 | B2* | 8/2019 | Davis | H04L 67/10 |
| 10,546,411 | B2* | 1/2020 | Feng | G06F 16/9024 |
| 11,604,829 | B2* | 3/2023 | Li | G06F 16/24569 |
| 2020/0175072 | A1* | 6/2020 | Harris | G06F 16/9024 |
| 2022/0229903 | A1* | 7/2022 | Manevitz | G06F 17/16 |
| 2022/0342934 | A1* | 10/2022 | Guan | G06F 16/9024 |

* cited by examiner

*Primary Examiner* — Jorge A Casanova

(57) ABSTRACT

A programmable device receives commands from a processor and, based on the commands: identifies a root node in a graph; identifies nodes in the graph that are neighbors of the root node; identifies nodes in the graph that are neighbors of the neighbors; retrieves data associated with the root node; retrieves data associated with at least a subset of the nodes that are neighbors of the root node and that are neighbors of the neighbor nodes; and writes the data that is retrieved into a memory.

27 Claims, 11 Drawing Sheets

DEVICES AND METHODS FOR ACCESSING AND RETRIEVING DATA IN A GRAPH

RELATED APPLICATION

This application claims priority to Chinese Patent Application No. CN202111285510.4, filed on Nov. 2, 2021.

BACKGROUND

A graph is a type of data structure or database that is stored and operated on by a computing system and that models a set of objects and the connections (relationships) between the objects. The objects are represented as nodes (or vertexes) in the graph that are connected or linked by edges. Attributes of an object and node structure information are associated with the node representing that object.

Graphs can be used to identify dependencies, clustering, similarities, matches, categories, flows, costs, centrality, and the like in large data sets. Graphs are utilized in types of applications that broadly include, but are not limited to, graph analytics and graph neural networks (GNNs), and that more specifically include applications such as online shopping engines, social networking, recommendation engines, mapping engines, failure analysis, network management, and search engines.

Graphs allow faster retrieval and navigation of complex hierarchical structures that are difficult to model in relational systems. Graph data generally includes node structure information and attributes. The node structure information can include, for example, information that identifies a node (e.g., a node ID) and information that identifies other nodes that are neighbors of the node (e.g., edge pointers). The attributes can include characteristics or properties of an object that are associated with the node representing the object and values of those characteristics or properties. For example, if the object represents a person, then the characteristics or properties might include the person's age and gender, in which case the attributes might also include a value for age and a value for gender.

The sizes of graphs are in the range of terabytes. Graphs can include billions of nodes and trillions of edges. Consequently, a graph may be partitioned into sub-graphs, and the sub-graphs may be distributed across multiple devices. That is, a large graph may be partitioned into smaller sub-graphs that are stored in different devices.

In applications like those mentioned above, data (e.g., structure information and/or attributes) are accessed and retrieved for a node of interest (referred to as the root node), for nodes that are neighbors of the root node, and for nodes that are neighbors of the neighbors. There is a performance cost associated with each node and edge, and so the overhead (e.g., computational resources consumed) to access and retrieve data in large graphs can be substantial, especially considering the number and frequency of such operations. Accordingly, to support the number and frequency of memory requests in applications like graph analytics and GNNs, a considerable amount of hardware is needed, which increases equipment and facility costs and energy consumption.

Thus, improving the efficiency at which data in large graphs, including distributed graphs, can be accessed and retrieved would be beneficial.

SUMMARY

Embodiments according to the present disclosure introduce methods, devices, and systems that improve the efficiency at which data in large graphs, including distributed graphs, can be accessed and retrieved.

More specifically, disclosed are programmable devices that have a novel hardware architecture for efficiently accessing and retrieving data in graphs, including large, distributed graphs. Also disclosed are systems that include such devices and methods that are performed using such devices.

In embodiments, the disclosed programmable devices receive commands from a processor and, based on those commands, perform operations that include: identifying a root node in a graph; identifying nodes in the graph that are neighbors of the root node; identifying nodes in the graph that are neighbors of the neighbors; retrieving data associated with the root node; retrieving data associated with at least a subset of the nodes that are neighbors of the root node and that are neighbors of the neighbor nodes; and writing the data that is retrieved into a memory.

The disclosed programmable devices are able to perform such operations much faster than if those operations were performed by the processor. Measured results indicate that those operations are performed four times faster by the disclosed devices, and even faster speeds are predicted.

Consequently, embodiments according to the present disclosure more efficiently utilize the hardware resources of computing systems that execute memory requests in applications like graph analytics and graph neural networks. As a result, fewer hardware resources are required and energy consumption is decreased, reducing costs without reducing performance.

These and other objects and advantages of the various embodiments of the invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Figure 1:
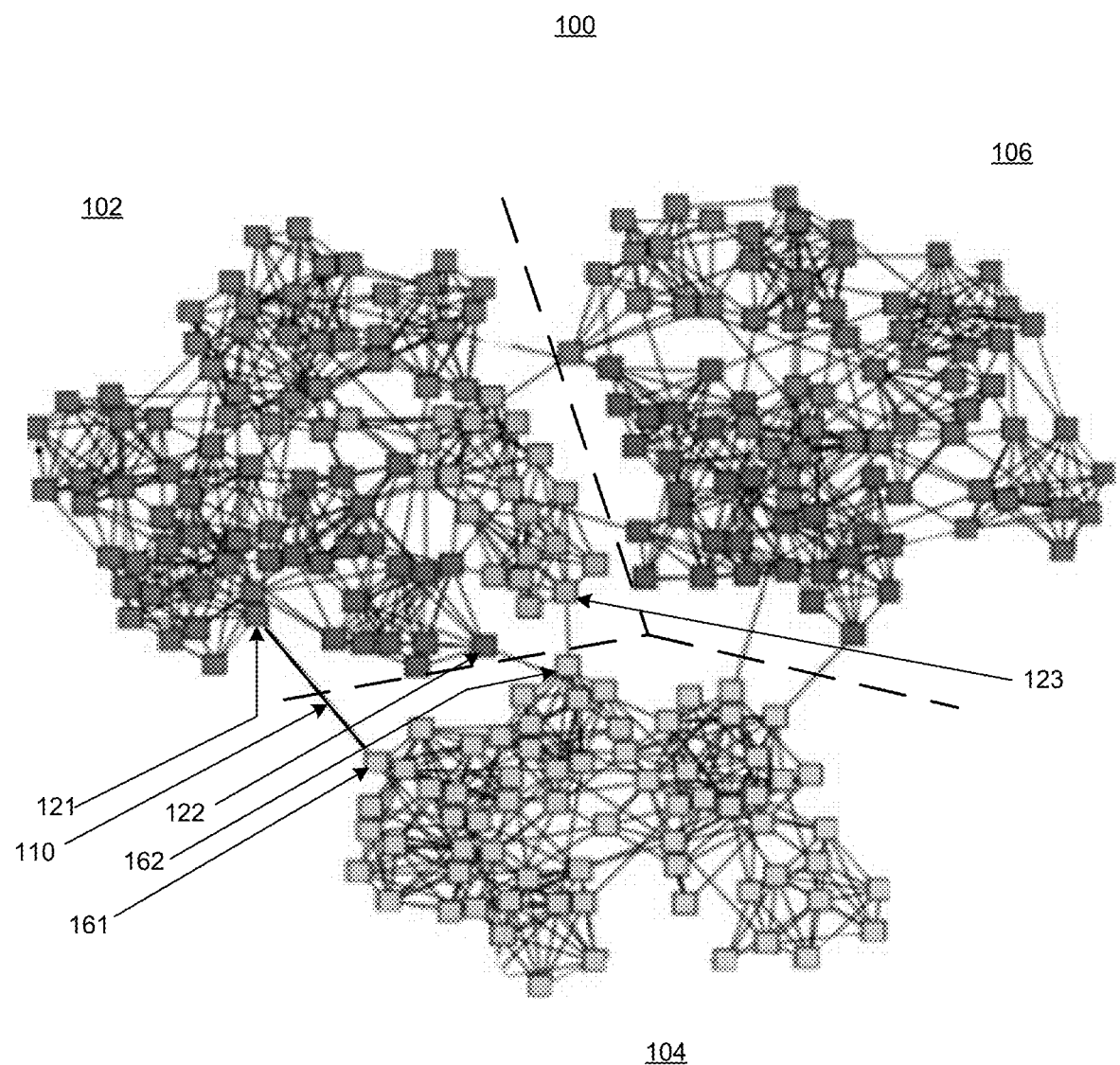
FIG. 1 illustrates an example of a distributed graph architecture for a graph that is stored on and executed by a computing system in embodiments according to the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "receiving," "retrieving," "sampling," "sending," "writing," "reading," "identifying," "requesting," "storing," "selecting," "indicating," "ordering," "putting," "placing," "obtaining," or the like, refer to actions and processes of a programmable device or computing system (e.g., the methods of FIGS. 4, 5, and 7-10) or similar electronic computing/programmable device or system (e.g., the system and devices of FIGS. 2A, 2B, and 3). A computing system or similar electronic computing/programmable device manipulates and transforms data represented as physical (electronic) quantities within memories, registers or other such information storage, transmission or display devices.

Some elements or embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, double data rate (DDR) memory, random access memory (RAM), static RAMs (SRAMs), dynamic RAMs (DRAMs), block RAM (BRAM), read only memory (ROM), electrically erasable programmable ROM (EEPROM), flash memory (e.g., an SSD) or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIGS. 4, 5, and 7-10 are flowcharts of device- or computer-implemented methods in embodiments according to the present disclosure. All or some of the operations represented by the blocks in those flowcharts can be implemented as device- or computer-executable instructions residing on some form of non-transitory computer-readable storage medium, and executed by a computing system such as the computing system 200 of FIG. 2A or devices such as the device 211 of FIG. 3.

FIG. 1 illustrates an example of a graph architecture for a graph 100 that is stored on and executed by a computing system or device (e.g., the computing system or devices of FIGS. 2A, 2B, and 3) in embodiments according to the present disclosure. The graph 100 includes a number of nodes (each node is represented as a square in FIG. 1). In the example of FIG. 1, the graph 100 is logically partitioned into three communities or sub-graphs 102, 104, and 106; however, the number of sub-graphs is not so limited. Also, the present disclosure is not limited to a distributed graph architecture like that depicted in FIG. 1; that is, the graph 100 may consist of a single graph or sub-graph.

In general, a community is a subset of nodes of a graph, such that the number of edges inside the community is greater than the number of edges that link the community with the rest of the graph. The graph 100 can be logically partitioned into communities, or sub-graphs, using a community detection algorithm such as, but not limited to: K-L; Girvan-Newman; multi-level; leading eigenvector; and Louvain.

Each node in the graph 100 represents an object. Attributes and structure information for an object are associated with the node representing the object. The attributes of a node/object can include one or more characteristics or properties of the object (e.g., if the object represents a person, then the characteristics might include the person's age and/or gender), and the attributes data can include values of those characteristics (e.g., a numerical value for the person's age, and an indicator identifying the person's gender). The structure information of a node/object can include, for example, information that identifies a node (e.g., a node identifier, ID) and information that identifies the other nodes that the node is connected to (e.g., each edge connecting two nodes is identified by an edge pointer).

The sub-graphs are each connected by respective edges to adjacent sub-graphs by one or more hub nodes. For example, in FIG. 1, the sub-graph 102 includes hub nodes 121, 122, and 123 that are connected by respective edges to hub nodes 161 and 162 of the sub-graph 106. Hub nodes in the sub-graph 102 are similarly connected to hub nodes in the sub-graph 104, and vice versa, and hub nodes in the sub-graphs 104 and 106 are similarly connected.

Adjacent or neighboring sub-graphs (e.g., the sub-graphs 102 and 104) are connected to each other by a single hop over, for example, the edge 110 that connects the hub nodes 121 and 161. The nodes within the sub-graphs in the graph 100 are also interconnected by edges.

Figure 2A:
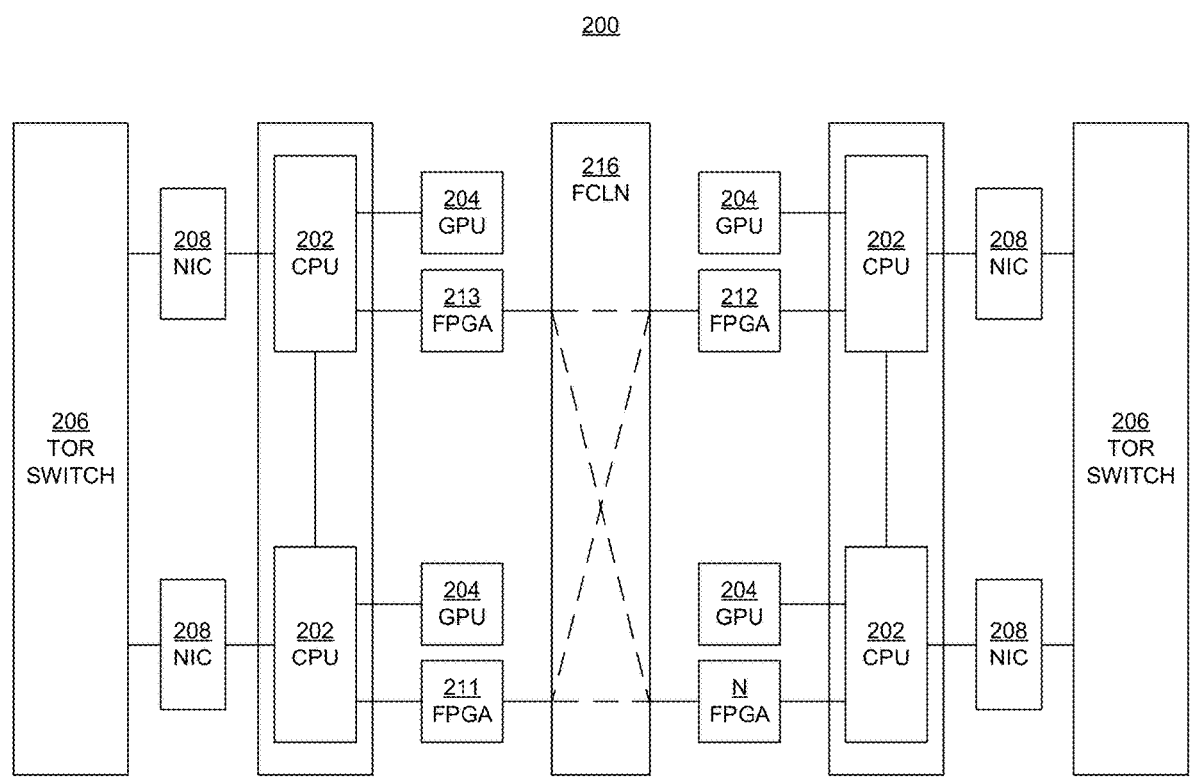
FIG. 2A is a block diagram showing components of an example of a computing system in embodiments according to the present disclosure.

FIG. 2A is a block diagram showing components of an example of a computing system 200 in embodiments according to the present disclosure. The computing system 200 can be used to store and execute a distributed graph architecture like the graph 100 in the example of FIG. 1.

In the example of FIG. 2A, the computing system 200 includes a number of central processing units (CPUs) exemplified by the CPUs 202. In the illustrated embodiment, each of the CPUs 202 includes or is coupled to a respective graphics processing unit (GPU), exemplified by the GPUs 204. In an embodiment, the CPUs 202 are connected to a respective top-of-rack (TOR) switch (e.g., the TOR switches 206) via network interface cards (NICs) (e.g., the NICs 208).

In embodiments, each of the CPUs 202 is also connected to a respective device or integrated circuit, exemplified by the devices 211, 212, 213, . . . , N (211-N). In the embodiment of FIG. 2A, the devices 211-N are field programmable gate arrays (FPGAs). However, the invention is not so limited. For example, the devices 211-N may be, but are not limited to, an application-specific integrated circuit (ASIC), a coarse-grain reconfigurable array (CGRA), or some other type of intellectual property (IP) core, or they may be embedded in another processor chip as an accelerator engine.

In embodiments, the devices 211-N are interconnected in a manner such that any of these devices can communicate with and transfer data to and from any other of these devices. In an embodiment, the devices 211-N are interconnected by a fully connected local network (FCLN) 216. As described below in conjunction with FIG. 3, in embodiments, the devices 211-N are each connected to an interfacing device 316 (e.g., memory-over-fabric, MoF). The interfacing device 316 can serve as the communication interface across the system 200.

Figure 2B:
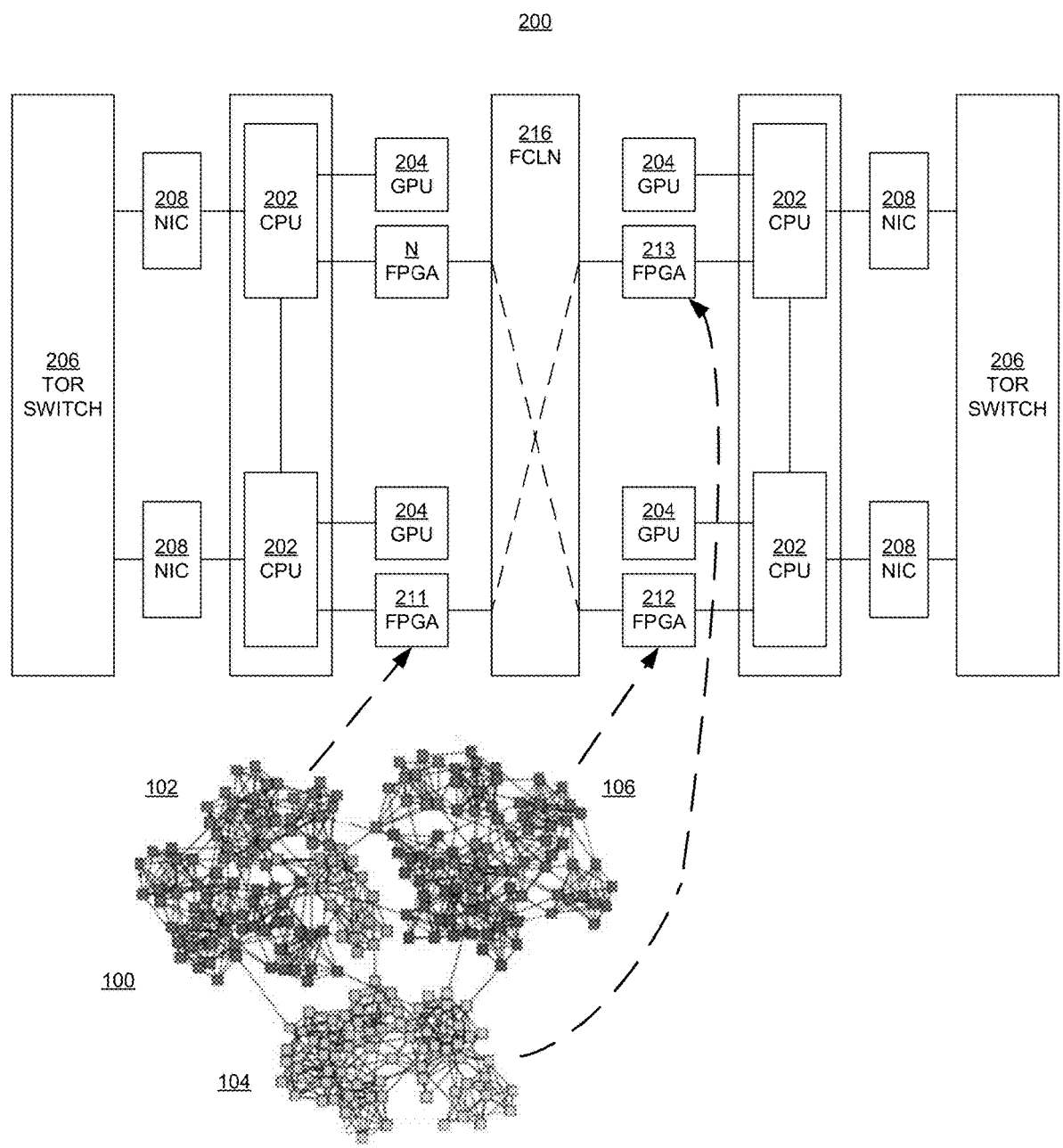
FIG. 2B illustrates an example of a mapping of sub-graphs of a distributed graph to programmable devices in the computing system in embodiments according to the present disclosure.

FIG. 2B illustrates an example of a mapping of the sub-graphs 102, 104, and 106 to the devices 211-N in embodiments according to the present disclosure. In those embodiments, each of the devices 211-N stores and computes a respective sub-graph. In this example, the sub-graph 102 is stored and computed by the device 211, the sub-graph 106 is stored and computed by the device 212, and the sub-graph 104 is stored and computed by the device 213.

Figure 3:
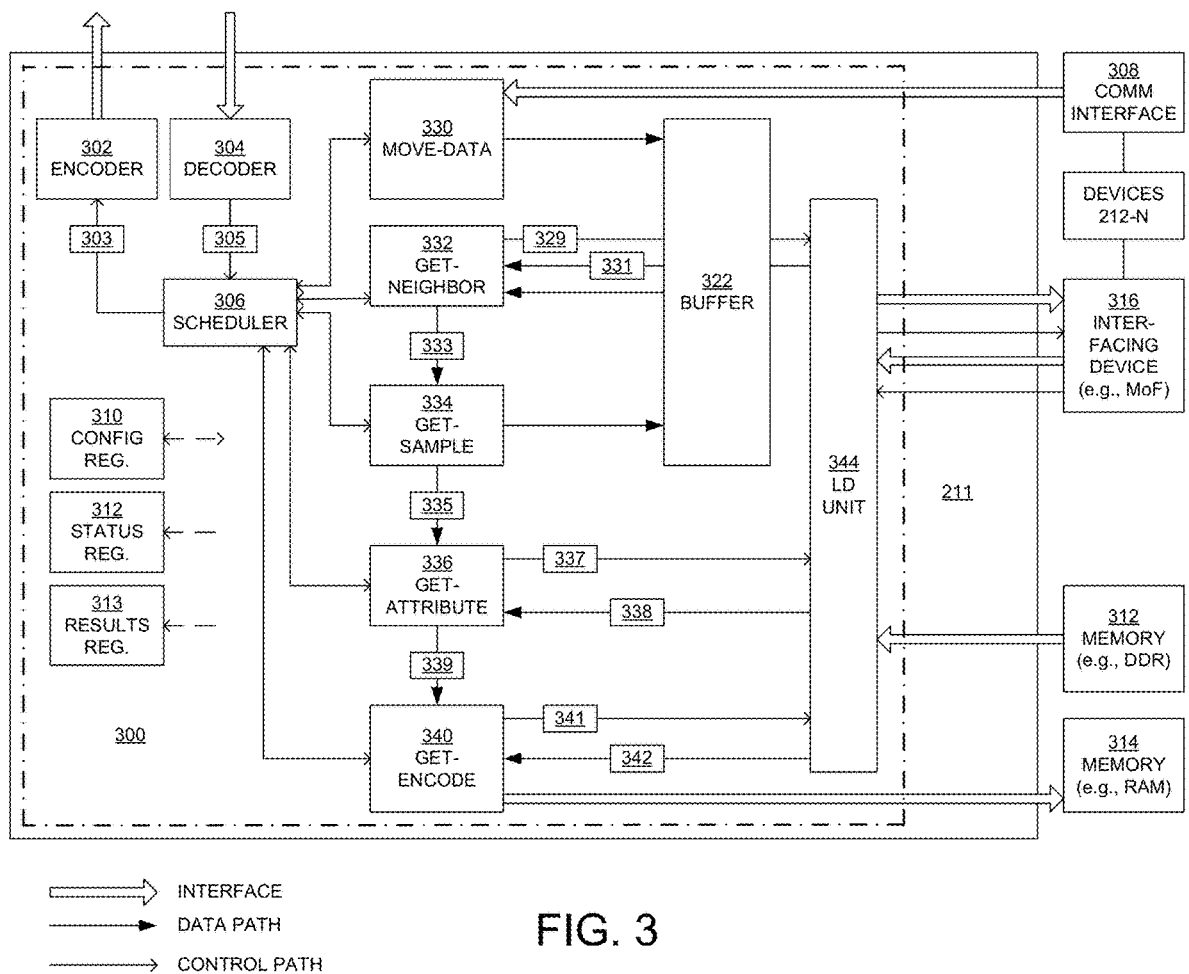
FIG. 3 is a block diagram illustrating selected elements or components of a programmable device in embodiments according to the present disclosure.

FIG. 3 is a block diagram illustrating selected elements or components of a device (e.g., the device 211) that stores and computes a sub-graph in embodiments according to the present disclosure. The other devices 212, 213, . . . , N (212-N) of FIG. 2A are configured like and function like the device 211, at least to the extent described herein. The devices 211-N can include elements or components in addition to those illustrated and described below, and the elements or components can be coupled as shown in the figure or in a different way.

Some of the blocks in the example device 211 are described in terms of the function they perform. While described and illustrated as separate blocks, the present invention is not so limited; that is, for example, a combination of these blocks/functions can be integrated into a single block that performs multiple functions.

The device 211 includes or is coupled to a communication (comm) interface 308 (e.g., an Advanced eXtensible Interface, AXI) that may be coupled to or interface with a buffer or a bus (e.g., a Peripheral Component Interconnect Express, PCIe, connection) for communication with other devices on the same chip or hardware. The device 211 is also coupled to the other devices 212-N via an interfacing device 316 (e.g., MoF), to access the memories (remote memories) of those other devices and the sub-graphs stored in those memories.

The device 211 is also coupled to its local memories via a load unit (LD unit) 344. As mentioned above, the device 211 can store and compute the sub-graph 102 (FIG. 2B), for example. The local memories include a memory 312 (e.g., DDR memory) that stores attributes and node IDs and other node structure information for the nodes of the sub-graph 102. The memory 312 can be accessed by or interfaces with the other devices 212-N via the interfacing device (e.g., MoF) 316. A memory 314 (e.g., RAM) is also coupled to the device 211 through the LD unit 344 for storing results (outputs) as further described below. The memory 314 may also be coupled to or interface with the other devices 212-N or to the PCIe connection.

Significantly, the device 211 (e.g., an FPGA) of FIG. 3 includes one or more buffers (e.g., the buffer 322) and a number of functional blocks 330, 332, 334, 336, and 340, referred to herein as a move-data block 330, a get-neighbor block 332, a get-sample block 334, a get-attribute block 336, and a get-encode block 340. The move-data block 330, the get-neighbor block 332, the get-sample block 334, the get-attribute block 336, and the get-encode block 340 may be referred to herein as first circuitry, second circuitry, third circuitry, fourth circuitry, and fifth circuitry, respectively, of an integrated circuit 300. In an FPGA implementation, for example, a functional block includes one or more programmable or configurable logic blocks (CLBs) and a hierarchy of reconfigurable interconnects. Each CLB includes circuitry that is wired through the reconfigurable interconnects to be configured for different functions. Each of the CLBs can perform its operations in parallel with the other CLBs. As noted above, embodiments according to the disclosure are not limited to an FPGA implementation.

In the FIG. 3 embodiment, the device 211 includes a command encoder 302 and a command decoder 304 that are coupled to a command scheduler 306 (e.g., a TOP scheduler). The device 211 also includes a number of registers that are each shared by the functional blocks 330, 332, 334, 336, and 340. In embodiments, the shared registers include a configuration register 310, a status register 312, and a results register 313. In embodiments, the device 211 also includes a number of first-in first-out buffers (FIFOs), including but not limited to FIFOs 303, 305, 329, 331, 333, 335, 337, 338, 339, 341, and 342.

The encoder 302, the decoder 304, the scheduler 306, the LD unit 344, the move-data block 330, the get-neighbor block 332, the get-sample block 334, the get-attribute block 336, and the get-encode block 340, as well as the aforementioned registers, buffer 322, and FIFOs, constitute elements of the integrated circuit 300, also referred to herein as an access engine (AxE) or neural network accelerator engine, that is implemented on the device 211. The access engine 300 is a domain-specific accelerator for graph analytics and graph neural networks (GNNs). The access engine 300 may include elements other than those just mentioned, such as an error handler, for example.

In a sub-graph of the graph 100 (FIG. 1), a node of interest is referred to herein as the root node. For example, a node can be selected, and the attributes of that node (the root node) can be read or fetched (accessed and retrieved).

In overview, the disclosed programmable devices (e.g., the device 211) efficiently access and retrieve data in graphs, including large, distributed graphs such as the graph 100. In embodiments, the device 211 receives commands from a processor (e.g., one of the CPUs 202 of FIG. 2B) via the decoder 304 and, based on those commands, performs operations that include, but are not limited to: identifying a root node in a graph; identifying nodes in the graph that are neighbors of that root node; identifying nodes in the graph that are neighbors of those neighbors; retrieving data associated with the identified root node; retrieving data associated with at least a subset of the nodes that are neighbors of the identified root node and that are neighbors of the neighbor nodes; and writing the data that is retrieved into a memory (e.g., the memory 314). The data that is accessed and retrieved may be data that is stored locally on the device 211 (e.g., in the memory 312), or it may be data that is stored remotely on one or more of the other devices 212-N, in which case it is accessed and retrieved from the memories of those other devices via the interfacing device (e.g., MoF) 316.

The configuration register 310 and the status register 312 are written with information that controls or tracks the functional blocks of the access engine (integrated circuit) 300. The configuration register 310 includes, for example: information that specifies the sampling method (e.g., random, weight-based, etc.), sample rate, batch size (number of nodes to read, sample size), and attribute dimension; address information (e.g., the address of a request stored on AXI-BRAM, address offsets in the local memory 312 on the device 211 and/or a remote memory stored on another device 212-N, edge start address, attribute start address, etc.); and graph information (e.g., number of partitions/sub-graphs, number of nodes per partition, number of edges per partition, etc.). The weight of a node may be based on, for example, the distance of the node from the root node measured by the number of hops between the node and the root node.

In general, the access engine 300 reads information from the configuration register 310, performs operations such as those mentioned above according to that information, writes information to the status register 312 that accounts for the operations performed, and writes results to the results register 313.

Commands associated with the configuration register 310 and the status register 312 include set, read, gather, and sample commands. A set command is used to write a value to the configuration register 310, and a read command is used to read a value from the configuration register. A gather command is used, in general, to gather the node IDs of neighbor nodes and nodes that neighbor the neighbor nodes, for a given root ID. A sample command is used, in general, to gather the node IDs of neighbor nodes and nodes that neighbor the neighbor nodes, but only for the subset of those nodes that are to be sampled, for a given root ID. The gather and sample commands also set a start address in the memory 314 (e.g., RAM) where the gathered data (e.g., attribute values) are to be stored.

The move-data block 330 receives and retrieves the root node ID in response to a sample or gather command.

Figure 4:
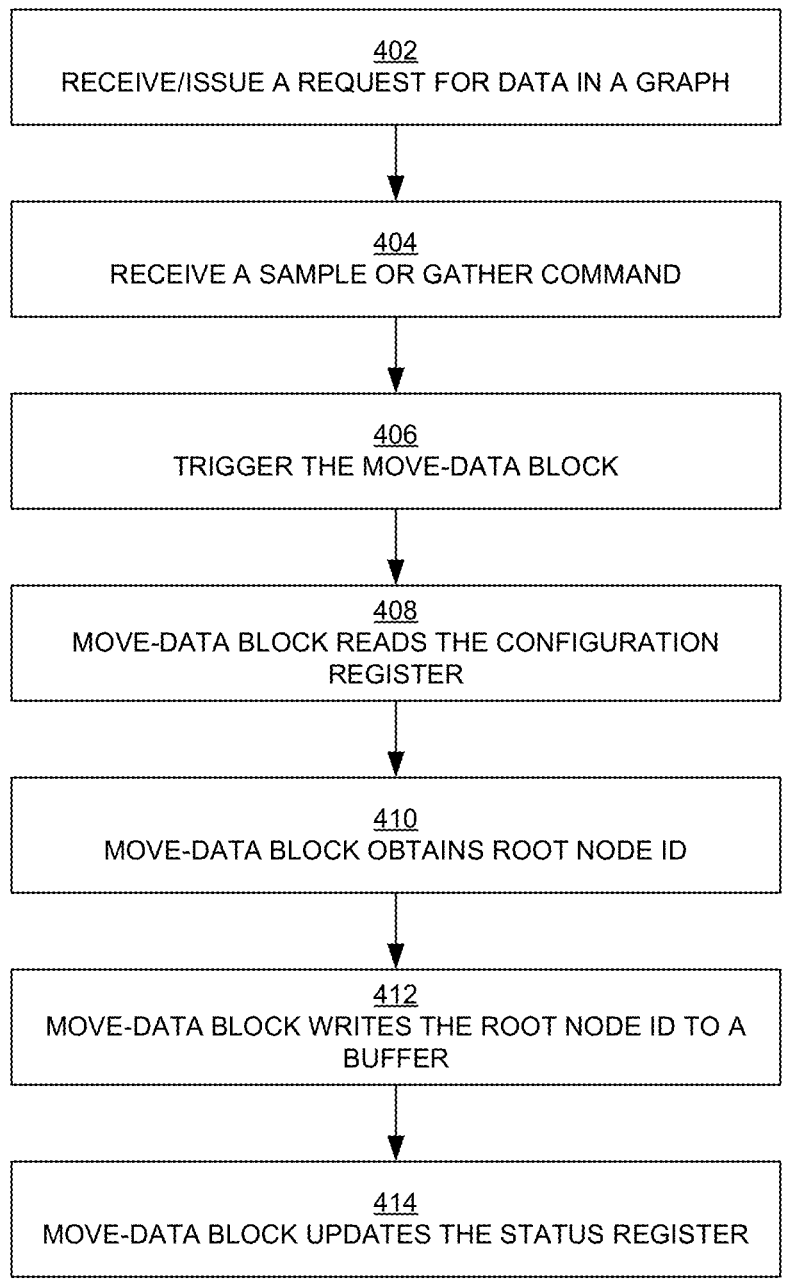
FIGS. 4 and 5 are flowcharts of device- or computer-implemented methods in embodiments according to the present disclosure.

More specifically, with reference to FIGS. 2B, 3, and 4, the system 200 receives or issues a request to access and retrieve data in the graph 100 (block 402) for and associated with a given root node. Accordingly, in block 404, a sample or gather command is received by the decoder 304 from one of the CPUs 202, and the command is added to the FIFO 305. When it receives the command from the FIFO 305, the scheduler 306 triggers the move-data block 330 to start (block 406). In block 408, the move-data block 330 reads the configuration register 310 to obtain information such as the address of the request on the communication interface 308 (e.g., AXI) and the batch (e.g., sample) size. In block 410, the move-data block 330 uses that information to obtain the root node ID. In block 412, the move-data block 330 writes the root node ID to the buffer 322. In block 414, the move-data block 330 updates the status register 312 to indicate successful completion of its operations.

The get-neighbor block 332 determines and retrieves (reads or fetches) the node IDs of nodes that are either adjacent to the root node (neighbors of the root node) or near the root node (neighbors of the neighbors of the root node). The node IDs constitute a relatively small amount of data, and so getting those node IDs consumes only a relatively small amount of system resources (e.g., bandwidth).

Figure 5:
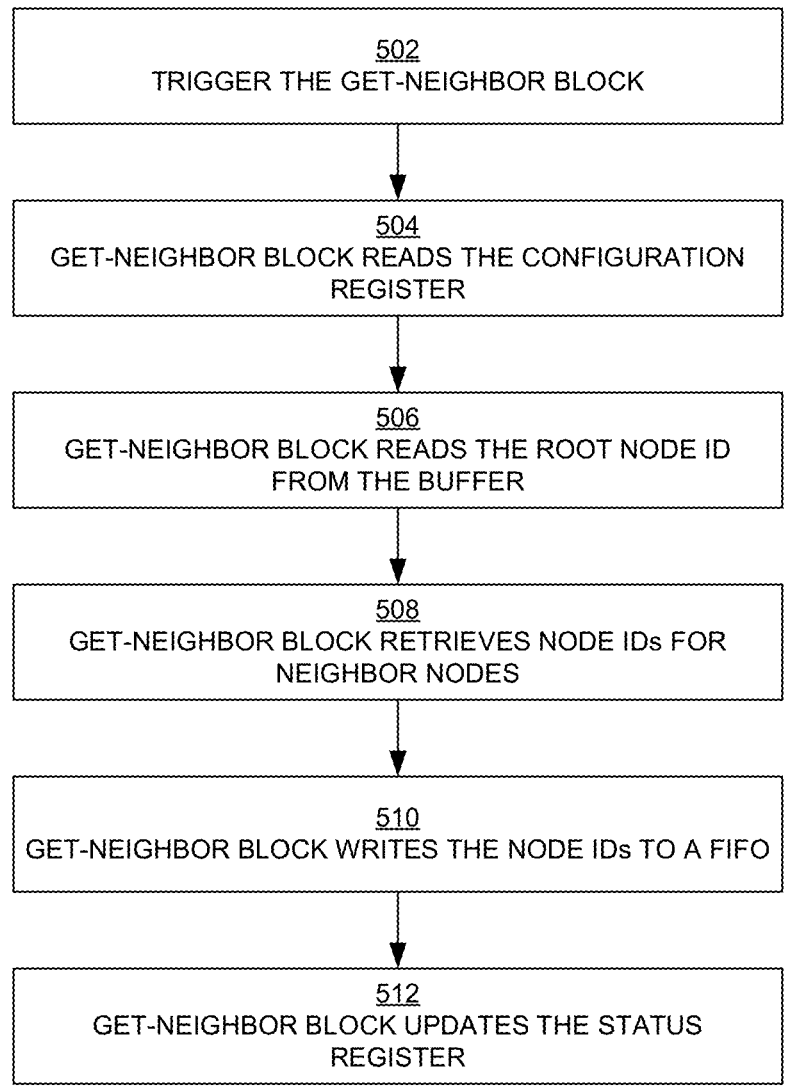

More specifically, with reference to FIGS. 3 and 5, the scheduler 306 triggers the get-neighbor block 332 to start (block 502). In block 504, the get-neighbor block 332 reads the address offset (in the local memory or a remote memory) from the configuration register 310. In block 506, the get-neighbor block 332 reads the root node ID from the buffer 322.

In block 508, the get-neighbor block 332 retrieves the node IDs for the neighbors of the root node and for the neighbors of the neighbors. In embodiments, the get-neighbor block 332 sends requests to the LD unit 344 to fetch those node IDs, and the LD unit 344 fetches the node IDs either from the local memory 312 if those nodes are stored locally on the device 211 or from a remote memory via the interfacing device 316 if those nodes are stored remotely on another one of the devices 212-N. To retrieve the node IDs of the neighbors of the neighbors, the get-neighbor block 332 uses information added to the buffer 322 by the get-sample block 334 as described below.

In block 510, the get-neighbor block 332 writes the node IDs for the root node neighbors and for the neighbors of the neighbors to the FIFO 333. In embodiments, for each node, the FIFO-head includes the node degree (the number of other nodes the node is connected to), and the FIFO-body includes the node ID and weight. Also, the information in the FIFO 333 is marked to separate the node information associated with one root node from the node information associate with another root node. In block 512, the get-neighbor block 332 updates the status register 312.

The node IDs fetched by the LD unit 344 may be in order or they may be out of order. In other words, as mentioned above, the get-neighbor block 332 sends requests to the LD to fetch node IDs, but the order in which the node IDs are fetched may be different from the order in which the requests are sent. In embodiments, each request is tagged to indicate the order of the request relative to the other requests, and the response to a request includes the tag included in that request. In the tag information in the response, the get-neighbor block 332 can determine whether the fetched node IDs are in order or are out of order. If the responses are out of order, the get-neighbor block 332 puts them in order based on the tags.

Figure 6:
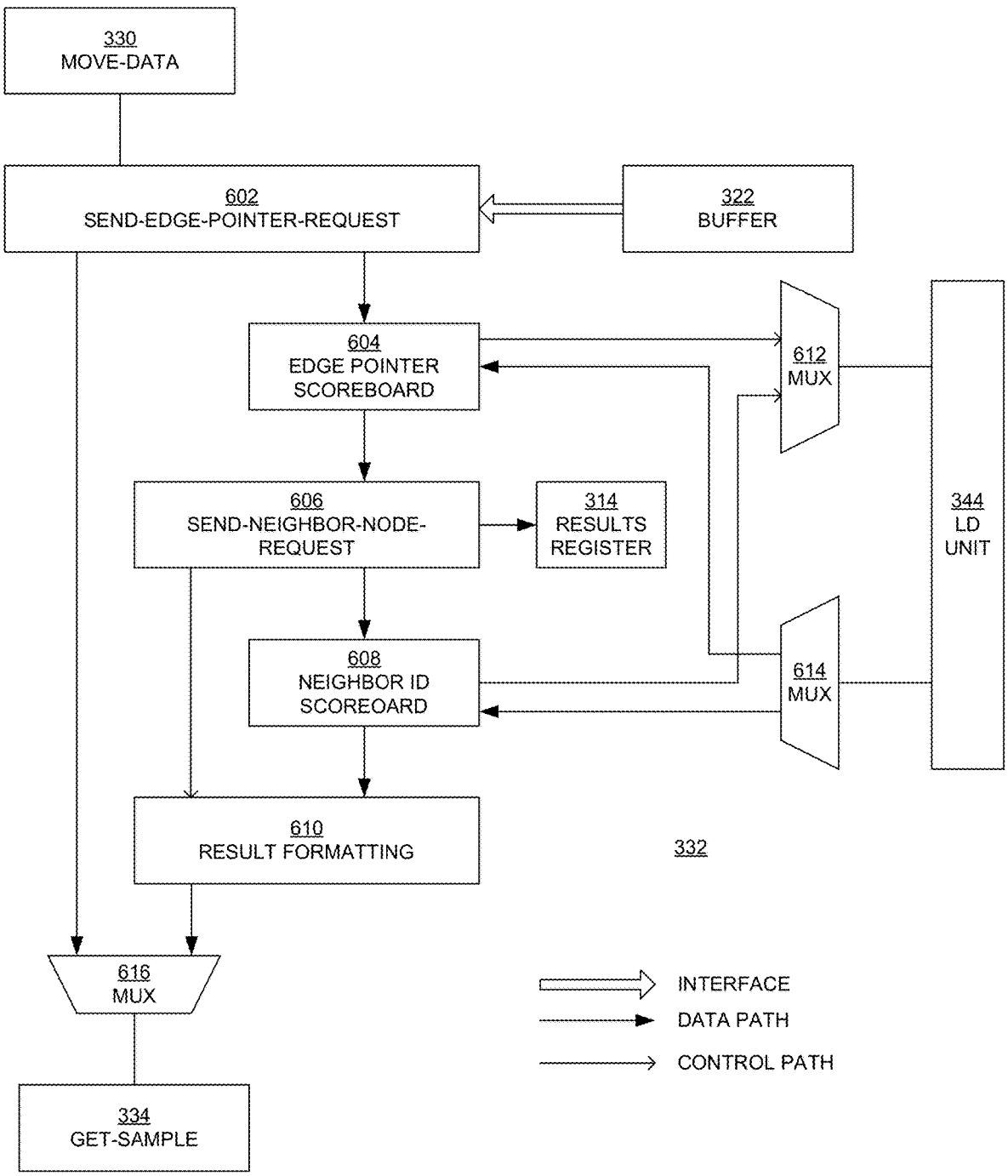
FIG. 6 is a block diagram illustrating selected elements or components of a programmable device in embodiments according to the present disclosure.

FIG. 6 is a block diagram illustrating selected elements of the get-neighbor block 332 that are used to place out-of-order responses in order, in embodiments according to the present disclosure. A root node ID is read from the buffer 322. The send-edge-pointer-request block 602 issues requests for the edge pointers that point to the neighbors of the root node, and those requests are added to the scoreboard 604 and then sent from that scoreboard to the LD unit 344 through the multiplexer (MUX) 612. The requested edge pointers are received in the scoreboard 604 through the MUX 614, and sent to the send-neighbor-node-request block 606, which writes the number of neighbor nodes to the results register 313. The send-neighbor-node-request block 606 issues requests for the node IDs of the neighbors of the root node, and those requests are added to the scoreboard 608 and then sent from that scoreboard to the LD unit 344 through the MUX 612. The requested node IDs are received in the scoreboard 608 through the MUX 614, and sent to the result formatting block 610. The MUXs 612 and 614 are used to determine which scoreboard the request came from and which scoreboard to send the requested information (edge pointer or node ID) to. The root node ID is sent directly to the MUX 616 from the buffer 322. The MUX 616 merges the node IDs from the result formatting block 610 and the root node ID, and the merged results are sent to the get-sample block 334.

With reference to FIG. 3, the get-sample block 334 then samples the nodes having the node IDs identified by the get-neighbor block 332. The sample may include all of the nodes identified by the get-neighbor block 332, or only a subset of those nodes. For example, a subset of those nodes can be chosen at random or based on weights assigned to the nodes.

Figure 7:
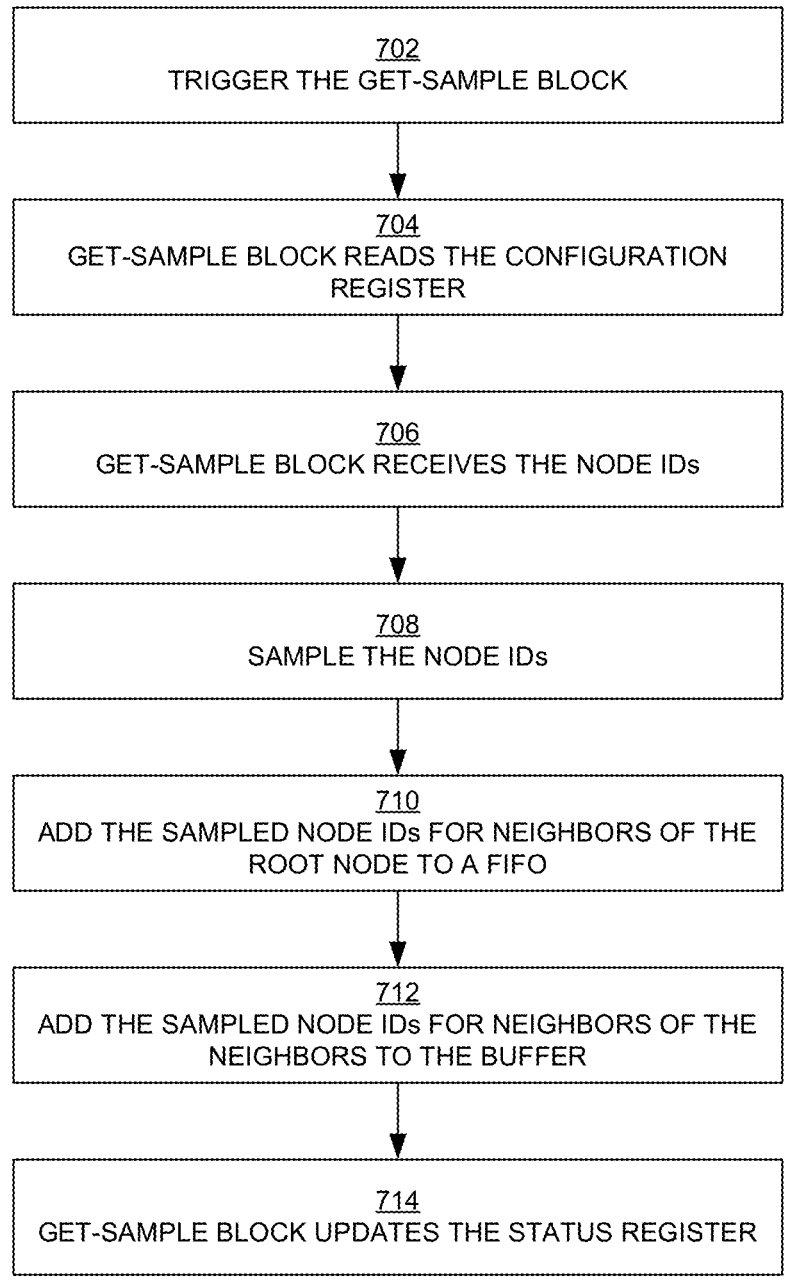
FIGS. 7, 8, 9, and 10 are flowcharts of device- or computer-implemented methods in embodiments according to the present disclosure.

More specifically, with reference to FIGS. 3 and 7, the scheduler 306 triggers the get-sample block 334 to start (block 702). In block 704, the get-sample block 334 reads the sampling method, rate, and other relevant or required information from the configuration register 310. In block 706, the get-sample block 334 receives the node IDs from the get-neighbor block 332 (from the FIFO 333). In block 708, the node IDs from the get-neighbor block 332 are sampled. The sampled node IDs include node IDs for the neighbors of the root node and also include node IDs for the neighbors of the neighbors. In block 710, the sampled node IDs for the neighbors of the root node, and the root node ID, are added to the FIFO 335. In block 712, the sampled node IDs for the neighbors of the root node are added to the buffer 322, where they can be accessed by the get-neighbor block 322 to obtain node IDs for nodes that are neighbors of the neighbors of the root node, as described above. In block 714, the get-sample block 334 updates the status register 312.

The get-attribute block 336 then retrieves the attributes of the root node and of the nodes sampled by the get-sample block 334. If only a selected subset of nodes is included in the sample as mentioned above, the amount of data (attributes) that is retrieved is reduced, thereby consuming less system resources.

Figure 8:
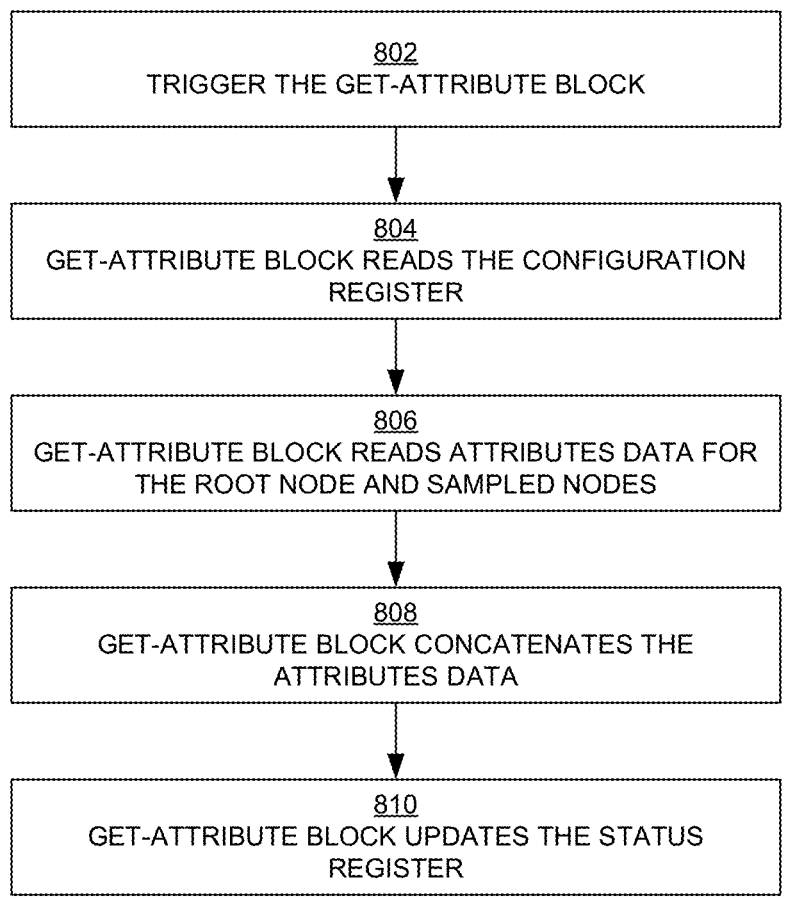

More specifically, with reference to FIGS. 3 and 8, the scheduler 306 triggers the get-attribute block 336 to start (block 802). In block 804, the get-attribute block 336 reads the address offset (in the local memory or a remote memory) from the configuration register 310.

In block 806, the get-attribute block 336 receives or reads the attributes data (attribute values) for the root node and the attributes data (attribute values) for each of the sampled neighbor nodes, using the root node ID and the sampled node IDs in the FIFO 335. The attributes data are read from the local memory 312 (e.g., DDR) or from a remote memory via the interfacing device 316 (e.g., MoF), depending on where the attributes data are stored. In embodiments, the get-attribute block 336 sends requests for the attributes data to the LD unit 344. Each of the requests includes a respective tag or read ID. In response to the requests, the LD unit 344 fetches the attributes data either from the memory 312 if the data are stored locally on the device 211 or from a remote memory via the interfacing device 316 if the data are stored on another one of the devices 212-N. The LD unit 344 prepares and sends responses to the requests, where each response includes the attributes data and the tag or read ID from the corresponding request. The responses and their attributes data may or may not be in order relative to the order of the requests from the get-attribute block 336.

In block 808, the get-attribute block 336 concatenates the attributes data, and adds the data (including the tags or read IDs) to the FIFO 339. In block 810, the get-attribute block 336 updates the status register 312.

The get-encode block 340 then encodes the retrieved (fetched or read) attributes data and writes that data to the main memory 314 (e.g., RAM), where the data can be accessed if necessary, for other processing.

Figure 9:
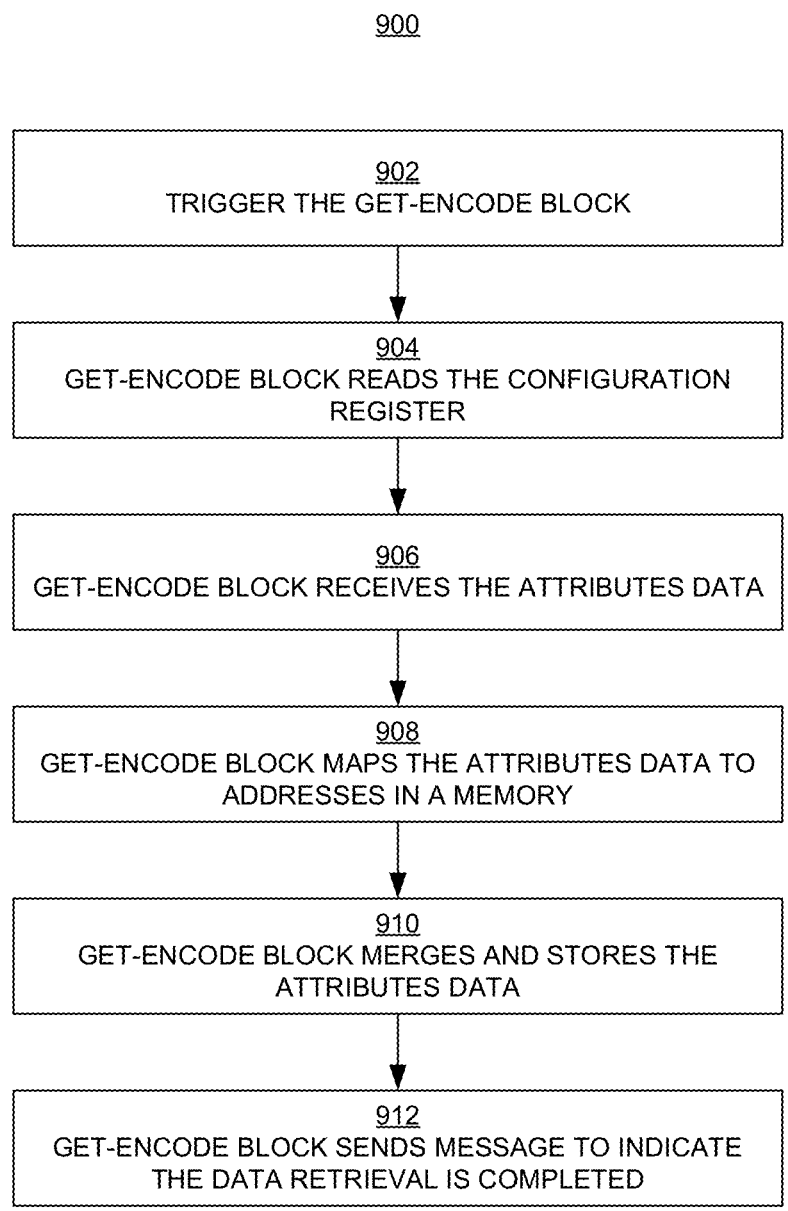

More specifically, with reference to FIGS. 3 and 9, the scheduler 306 triggers the get-encode block 340 to start (block 902). In block 904, the get-encode block 340 reads the address offset (in the memory 314) from the configuration register 310, where the attributes data are to be stored.

In block 906, the get-encode block 340 receives the attributes data from the get-attribute block 338 (from the FIFO 339). As noted above, the attributes data may or may not be in order. In block 908, the get-encode block 340 uses the tags or read IDs included with the attributes data to map that data to respective in-order addresses in the memory 314. In other words, the get-encode block 340 maps the attributes data to locations in the memory 314 such that, when that data is written to those locations, the data will be in order. In this manner, if the attributes data are out-of-order, they will be stored in order in the memory 314.

In block 910, the attributes data is merged and stored in (written to) the in-order addresses the memory 314. In block 912, the get-encode block 340 updates the status register 312. In embodiments, the get-encode block 340 also sends a message indicating that the response to the request to access and retrieve data in the graph (block 402 of FIG. 4) is complete.

Figure 10:
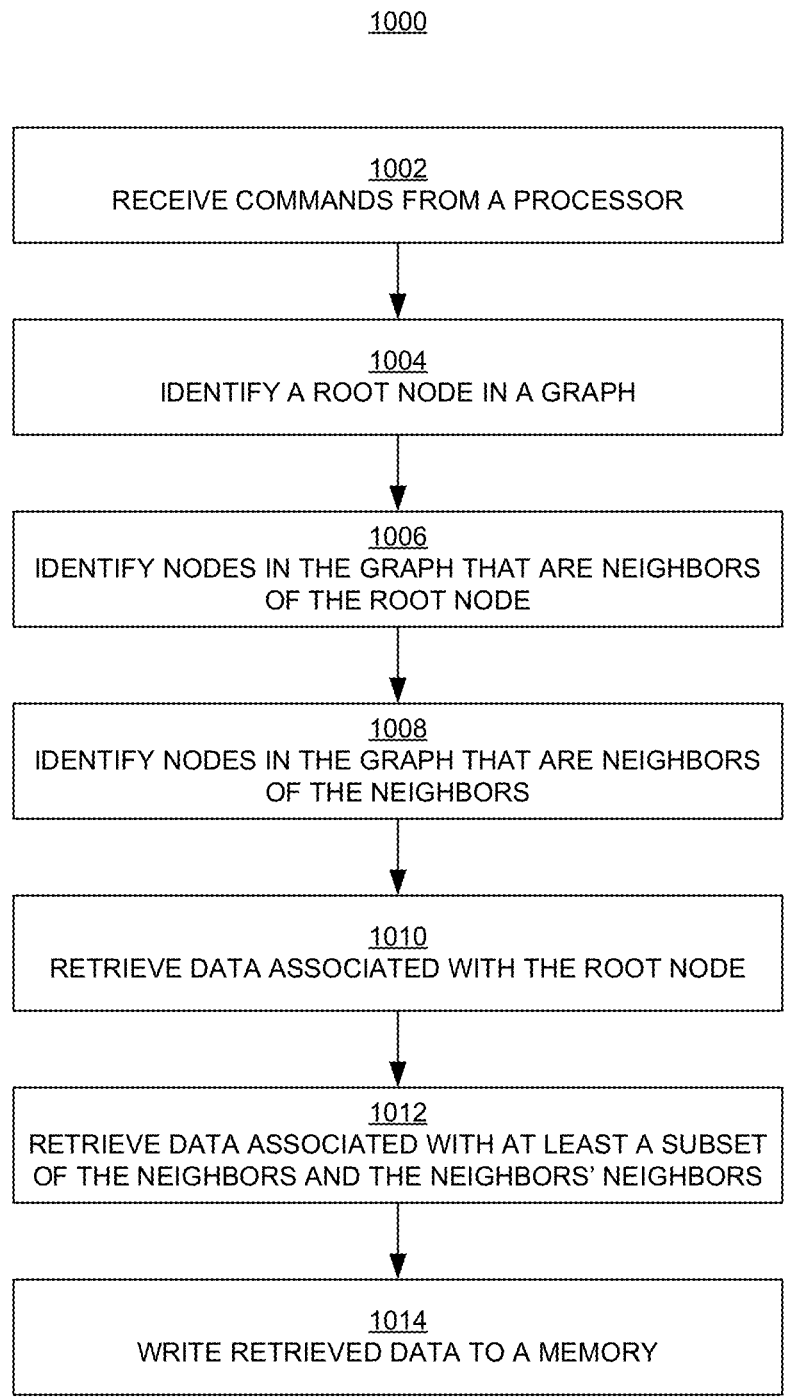

Referring now to FIGS. 3 and 10, in block 1002, a programmable device (e.g., the device 211) receives commands from a processor (e.g., one of the CPUs 202). In response to the commands, the programmable device: identifies a root node in a graph (block 1004); identifies nodes in the graph that are neighbors of the root node (block 1006); identifies nodes in the graph that are neighbors of the neighbor nodes (block 1008); retrieves data associated with the root node (block 1010); retrieves data associated with at least a subset of nodes selected from the neighbor nodes and the nodes that are neighbors of the neighbor nodes (block 1012); and writes the data that is retrieved into a memory of the programmable device (block 1014).

The programmable device performs the above operations much faster than if those operations were performed by a processor. Measured results indicate that those operations are performed four times faster by the programmable device. Consequently, embodiments according to the present disclosure more efficiently utilize the hardware resources of computing systems that execute memory requests in applications like graph analytics and graph neural networks. As a result, fewer hardware resources are required and energy consumption is decreased, reducing costs without reducing performance.

The foregoing disclosure describes embodiments in which data (e.g., node IDs and attributes data) are accessed and retrieved for a root node, neighbors of the root node, and neighbors of the neighbors of the root node. However, embodiments according to the present disclosure are not so limited. For example, the disclosure can be adapted or extended to instances in which data for only the root node and its immediate neighbors are accessed and retrieved, and to instances in which data for additional nodes (e.g., neighbors of the neighbors of the neighbors, and so on) are accessed and retrieved.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of configurations. In addition, any disclosure of components contained within other components should be considered as examples because many other architectures can be implemented to achieve the same functionality.

Although the subject matter has been described in language specific to structural features and/or methodological acts, it is to be understood that the subject matter defined in this disclosure is not necessarily limited to the specific features or acts described above. Rather, the specific features and acts described above are disclosed as example forms of implementing this disclosure.

Embodiments according to the invention are thus described. While the present invention has been described in particular embodiments, the invention should not be construed as limited by such embodiments, but rather construed according to the following claims.

What is claimed is:

1. An integrated circuit, comprising:
a decoder that receives and decodes commands from a processor;
a buffer;
first circuitry, coupled to a first memory that stores a sub-graph of a graph comprising structure information and values of attributes associated with nodes of the graph, that receives a command from the decoder, obtains a root node identifier (ID) of a root node of the graph in response to the command, and writes the root node ID to the buffer;
second circuitry that reads the root node ID from the buffer, receives node IDs for a first plurality of nodes in the graph that are neighbors of the root node and a second plurality of nodes in the graph that are neighbors of the first plurality of nodes, and outputs the root node ID and the node IDs that are received;
third circuitry that receives the root node ID and the node IDs output from the second circuitry, samples at least a subset of the node IDs output from the second circuitry, and outputs the root node ID and the node IDs that are sampled;
fourth circuitry that receives the root node ID and the node IDs output from the third circuitry, receives data associated with the root node and data associated with nodes identified by the node IDs that are sampled, and outputs the data that is received; and
fifth circuitry that receives the data output from the fourth circuitry, and writes the data received from the fourth circuitry into a second memory.

2. The integrated circuit of claim 1, wherein the second circuitry puts the node IDs for the first plurality of nodes and the node IDs for the second plurality of nodes in order when the node IDs for the first plurality of nodes and the node IDs for the second plurality of nodes are sent out-of-order.

3. The integrated circuit of claim 1, wherein the third circuitry writes the node IDs for the first plurality of nodes to the buffer, and wherein the second circuitry reads the node IDs for the first plurality of nodes from the buffer to retrieve the node IDs for the second plurality of nodes.

4. The integrated circuit of claim 1, wherein the data that is received by the fourth circuitry comprises attributes and node structure information comprising: a node identifier and an attribute value for the root node; a respective node identifier for each node of the first plurality of nodes and for each node of the second plurality of nodes; and a respective attribute value for each node of the subset of nodes.

5. The integrated circuit of claim 1, further comprising a configuration register coupled to the first, second, third, fourth, and fifth circuitries and that comprises at least: an address for the root node, and a sample size indicating how many nodes to include in the first plurality of nodes and the second plurality of nodes.

6. The integrated circuit of claim 5, wherein the configuration register comprises information that identifies a sampling method, and wherein the third circuitry uses the sampling method to determine how many nodes to include in the subset and which nodes to include in the subset.

7. The integrated circuit of claim 1, further comprising a load unit coupled to the second circuitry, wherein the load unit, in response to a request from the second circuitry, fetches the node IDs for the first plurality of nodes and the second plurality of nodes from a memory coupled to the load unit, and sends the node IDs for the first plurality of nodes and the second plurality of nodes to the second circuitry.

8. The integrated circuit of claim 7, wherein the load unit is also coupled to the fourth circuitry, wherein the load unit, in response to a request from the fourth circuitry, fetches the data associated with the root node and the data associated with nodes identified by the node IDs that are sampled, and sends the data that are fetched to the fourth circuitry.

9. The integrated circuit of claim 1, wherein the fifth circuitry places the data received from the fourth circuitry in order when the data are written to the second memory.

10. A system, comprising:
a processor;
a plurality of memories coupled to the processor; and
a plurality of interconnected neural network processing devices coupled to the processor, wherein each neural network processing device of the plurality of interconnected neural network processing devices:
stores a sub-graph of a graph comprising structure information and values of attributes associated with nodes of the graph, wherein a neural network processing device of the plurality of interconnected neural network processing devices, in response to commands received from the processor obtains a root node identifier (ID) of a root node of the graph, and writes the root node ID to a first memory,
reads the root node ID from the first memory,
receives node IDs for a first plurality of nodes in the graph that are neighbors of the root node and a second plurality of nodes in the graph that are neighbors of the first plurality of nodes, outputs the root node ID and the node IDs that are received, samples at least a subset of the node IDs output, outputs the root node ID and the node IDs that are sampled, receives data associated with the root node and data associated with nodes identified by the node IDs that are sampled, and writes the data that is received into a second memory of the plurality of memories.

11. The system of claim 10, wherein the data that is retrieved comprises: a node identifier and an attribute value for the root node; a respective node identifier for each node of the first plurality of nodes and for each node of the second plurality of nodes; and a respective attribute value for each node of the subset of nodes.

12. The system of claim 10, wherein the neural network processing device further comprises a buffer that stores an identifier of the root node, and wherein the neural network processing device uses the identifier of the root node read from the buffer to retrieve node identifiers of the first plurality of nodes and node identifiers of the second plurality of nodes.

13. The system of claim 12, wherein the neural network processing device puts the node identifiers of the first plurality of nodes and the node identifiers of the second plurality of nodes in order when the node identifiers of the first plurality of nodes and the node identifiers of the second plurality of nodes are received out-of-order.

14. The system of claim 12, wherein the neural network processing device further comprises a configuration register that comprises at least: an address for the root node, and a sample size indicating how many nodes to include in the first plurality of nodes and the second plurality of nodes.

15. The system of claim 14, wherein the configuration register comprises information that identifies a sampling method, and wherein the neural network processing device uses the sampling method to determine how many nodes to include in the subset of nodes and which nodes to include in the subset of nodes.

16. The system of claim 15, wherein the neural network processing device retrieves attribute values associated with the nodes included in the subset of nodes.

17. The system of claim 16, wherein the neural network processing device writes the attribute values associated with the nodes included in the subset of nodes to the memory.

18. The system of claim 17, wherein the neural network processing device places the attribute values in order when the attribute values are written to the memory.

19. A method performed by a programmable neural network accelerator engine, the method comprising:

storing a sub-graph of a graph comprising structure information and values of attributes associated with nodes of the graph;

receiving commands from a processor;

obtaining a root node identifier (ID) of a root node of the graph in response to the commands;

writing the root node ID to a first memory;

receiving node IDs for a first plurality of nodes in the graph that are neighbors of the root node and a second plurality of nodes in the graph that are neighbors of the first plurality of nodes;

outputting the root node ID and the node IDs that are received;

sampling at least a subset of the node IDs;

outputting the root node ID and the node IDs that are sampled;

receiving data associated with the root node and data associated with nodes identified by the node IDs that are sampled; and writing the data that is received into a second memory.

20. The method of claim 19, wherein the data that is retrieved comprises attributes and node structure information comprising: a node identifier and an attribute value for the root node; a respective node identifier for each node of the first plurality of nodes and for each node of the second plurality of nodes; and a respective attribute value for each node of the subset of nodes.

21. The method of claim 19, wherein the neural network accelerator engine further comprises a buffer, and wherein the method further comprises:

obtaining, by a first functional block of the neural network accelerator engine, an identifier of the root node, and storing the identifier of the root node in the buffer; and retrieving, by a second functional block of the neural network accelerator engine, node identifiers of the first plurality of nodes and node identifiers of the second plurality of nodes using the identifier of the root node read from the buffer.

22. The method of claim 21, further comprising the second functional block putting the node identifiers of the first plurality of nodes and the node identifiers of the second plurality of nodes in order when the node identifiers of the first plurality of nodes and the node identifiers of the second plurality of nodes are received out-of-order.

23. The method of claim 21, wherein the neural network accelerator engine further comprises a configuration register that comprises at least: an address for the root node, and a sample size indicating how many nodes to include in the first plurality of nodes and the second plurality of nodes.

24. The method of claim 23, wherein the configuration register comprises information that identifies a sampling method, and wherein the method further comprises determining, by a third functional block of the neural network accelerator engine, how many nodes to include in the subset of nodes and which nodes to include in the subset of nodes according to the sampling method.

25. The method of claim 24, further comprising receiving, by a fourth functional block of the neural network accelerator engine, attribute values associated with the nodes included in the subset of nodes.

26. The method of claim 25, wherein said writing the data comprises writing, by a fifth functional block of the neural network accelerator engine, the attribute values associated with the nodes included in the subset of nodes to the memory.

27. The method of claim 26, wherein said writing the attribute values comprises the fifth functional block placing the attribute values in order when the attribute values are written to the memory.

* * * * *